United States Patent
Brunner et al.

(10) Patent No.: US 9,068,073 B2
(45) Date of Patent: Jun. 30, 2015

(54) METHOD OF IMPROVING SCRATCH RESISTANCE AND RELATED PRODUCTS AND USES

(75) Inventors: Martin Brunner, Wallbach (CH); Bruno Rotzinger, Delémont (CH); Per Magnus Kristiansen, Zürich (CH); Rolf Benz, Muttenz (CH)

(73) Assignee: BASF SE, Ludwigshafen (DE)

( * ) Notice: Subject to any disclaimer, the term of this patent is extended or adjusted under 35 U.S.C. 154(b) by 1009 days.

(21) Appl. No.: 13/139,739

(22) PCT Filed: Dec. 11, 2009

(86) PCT No.: PCT/EP2009/066983
§ 371 (c)(1),
(2), (4) Date: Aug. 11, 2011

(87) PCT Pub. No.: WO2010/072592
PCT Pub. Date: Jul. 1, 2010

(65) Prior Publication Data
US 2011/0301265 A1   Dec. 8, 2011

(30) Foreign Application Priority Data

Dec. 22, 2008 (EP) .................................. 08172580

(51) Int. Cl.
*C08K 5/20* (2006.01)
*C08L 51/06* (2006.01)
*C08L 23/08* (2006.01)
*C08L 27/18* (2006.01)
*C08L 53/02* (2006.01)

(52) U.S. Cl.
CPC ............. *C08L 51/06* (2013.01); *C08L 23/0807* (2013.01); *C08L 27/18* (2013.01); *C08L 53/02* (2013.01); *C08L 2205/03* (2013.01)

(58) Field of Classification Search
USPC .................. 524/230, 502, 504, 515, 520, 522
See application file for complete search history.

(56) References Cited

U.S. PATENT DOCUMENTS

| 4,486,500 | A | * | 12/1984 | Naruo et al. | 428/336 |
| 5,858,527 | A | * | 1/1999 | Lee et al. | 428/327 |
| 2005/0154101 | A1 | * | 7/2005 | Mcenhill et al. | 524/210 |
| 2006/0009554 | A1 | | 1/2006 | Sharma | |
| 2006/0228481 | A1 | * | 10/2006 | Gros et al. | 427/299 |
| 2006/0276571 | A1 | | 12/2006 | Sharma | |

FOREIGN PATENT DOCUMENTS

WO  01/42352 A  6/2001
WO  2004/099303 A  11/2004

OTHER PUBLICATIONS

Xiang et al (Roles of Additives in Scratch Resistance of High Crystallinity Polypropylene Copolymers, Polymer Engineering and Science; Jan. 2001; 41, 1; 23-31).*

* cited by examiner

*Primary Examiner* — Wenwen Cai
(74) *Attorney, Agent, or Firm* — Oblon, McClelland, Maier & Neustadt, L.L.P.

(57) ABSTRACT

The present invention relates to methods of improving the scratch resistance of plastics materials and products made from them, such as articles in the automotive industry e.g. for the interior of automobiles, as well as the use of certain additives for that purpose and related invention embodiments. The improving comprises adding a friction modifier, and in addition a grafted polymer and a fatty acid amide, to a rubber modified polyolefin composition used as polymer substrate for the articles.

10 Claims, No Drawings

METHOD OF IMPROVING SCRATCH RESISTANCE AND RELATED PRODUCTS AND USES

The invention relates to the use of a combination of a grafted polymer, a fatty acid amide and an additional friction reducing agent to improve the scratch resistance of polymer compounds, corresponding polymer-based products and to corresponding methods and processes, as well as obtainable end products.

Polymeric compositions formed in accordance with the present invention are suitable for applications where the use of polymers of high scratch resistance finish is advantageous such as, for example, for automotive (interior or exterior) applications.

The technical and environmental advantages of polymers, especially PP (poly(propylene)) and TPO (thermoplastic poly (olefin)), for articles such as automotive interior parts have long been recognized in the automotive market. Most commercial TPO materials for these applications have the disadvantage that they must be coated with lacquer or paint or other coatings to provide sufficient scratch resistance and maintain uniform (low) gloss of the final part.

Advanced materials based on PP continue to be popular for automotive interior and exterior components due to major advantages such as low density, convenient processability and good cost/performance balance. The final customers (especially car buyers) continue to increase their quality demands. The (especially car) manufacturers try to meet these demands through improved aesthetics and quality, particularly in terms of surface properties, such as scratch resistance, styling harmony, new colours and valuable look, as well as good safety properties, e.g. avoiding disturbing light reflections and providing sufficient mechanical integrity for head impact events.

The highest level of interest for interior applications are seen in instrument panel structures, consoles, other interior trim parts, instrument panels as such and door panel skins, but also seat components, handles, cargo liners, engine compartment components or the like. Also in other fields corresponding materials are of interest, e.g. for machine housings, appliances, consumer or electronic devices, outdoor vehicles and devices or any other parts or (e.g. fibre or film) articles needing good scratch resistance, usually also further good mechanical strength and favourable optics, such as low gloss.

The main substrates, for which improved scratch resistance remains an unrealized need, are substrates like talc-filled PP copolymer or PP based TPEs (e.g. for skins). As the composition of these materials can vary in a wide range, it is clear, that scratch resistance depends on the resin used, the type and content of elastomer and fillers such as talc, stabilizers and co-additives as well as on pigments and other fillers or functional additives. In addition also the processing conditions and the surface texture (grain) play an important role in determining the final properties of a specific part.

In order to improve the scratch resistance of polymers appropriate in the application areas given above and below, various additives have been used. For example, unsaturated fatty acid amides, such as erucamide, also known as slip agents, reduce the coefficient of friction of surfaces, and have found widespread use as a means to improve the scratch resistance of plastic parts. It has, however, been found that small molecular weight additives such as the unsaturated fatty acid amides mentioned tend to move to the surface of the product in which they undergo degradation especially due to UV light, which may lead to an undesired stickiness.

Somewhat similar effects can be achieved by means of silicone-based additive system with varying molecular weight. These are frequently used on the market and provide mediocre scratch resistance, particularly to olefin-based compounds.

None of the scratch resistance solutions commercially available on the market today are able to fully meet the expectations of OEMs and, thus, there remains a need for further amelioration of the ways to improve the scratch resistance of polymers useful e.g. in the automotive field, especially also avoiding or sufficiently reducing exudation and especially also allowing for further improved scratch resistance compared to the effect of products known so far.

These new materials are intended to be used preferably without any coatings and may be used for both positive (grained during skin fabrication) and negative (grained in the mould tooling) forming processes.

Surprisingly, it has now been found that the use of a combination of a grafted polymer, especially a grafted polyolefin, and a friction reducing agent in addition to an unsaturated fatty acid amide allows improving (augment) the scratch resistance of rubber modified polymers, especially rubber modified polyolefins.

In addition to the further improved scratch resistance, less exudation is found in the presented formulations and therewith a diminished stickiness is observed, also after longer times.

The invention therefore, in a first embodiment, relates to the use, or a method of use, of a friction reducing agent, in combination with a grafted polymer, in addition to an unsaturated fatty acid amide, for improving the scratch resistance of a rubber modified polymer (especially a rubber modified polyolefin) comprising mixing said components to the rubber modified polymer, optionally also adding one or more further additives.

In a further embodiment, the invention relates to the use, or a method of use, of a friction reducing agent, in combination with a grafted polymer, in addition to an unsaturated fatty acid amide, for improving the scratch resistance and diminishing the exudation of components and/or reducing the tendency to evolve stickiness, especially upon light (including UV) exposure, of a rubber modified polymer (especially a rubber modified polyolefin) comprising mixing said components to the rubber modified polymer, optionally also adding one or more further additives.

In a further embodiment, the invention relates to a polymer product (with improved scratch resistance), comprising a mixture of a rubber modified polymer (especially a rubber modified polyolefin), an unsaturated fatty acid amide, a grafted polymer and a friction reducing agent, together with optional further additives.

In yet a further embodiment, the invention relates to the use, or a method of use, of a friction reducing agent, in combination with a grafted polymer, in addition to an unsaturated fatty acid amide, for improving the scratch resistance of a rubber modified polymer (especially a rubber modified polyolefin) end product comprising mixing said components to the rubber modified polymer (especially a rubber modified polyolefin), optionally also adding one or more further additives.

In yet a further embodiment, the invention relates to the use, or a method of use, of a friction reducing agent, in combination with a grafted polymer, in addition to an unsaturated fatty acid amide, for improving the scratch resistance and diminishing the exudation of components and/or reducing the tendency to evolve stickiness of a rubber modified polymer (especially a rubber modified polyolefin) end product comprising mixing said components to the rubber modified polymer (especially a rubber modified polyolefin), optionally also adding one or more further additives.

In yet a further embodiment, the present invention relates to an end product obtainable according to the uses and methods given above.

The following definitions can be used (each singly, or two or more or all of them) to define the general terms given in the embodiments of the invention given above and below more specifically, thus leading to more preferred embodiments of the invention.

Grafted polymers are preferably those obtainable by the reaction of an unsaturated carboxylic acid, an ester thereof and/or a vinyl aromatic compound with the backbone polymer, or mixtures of two or more of these modified polymers.

A grafted polymer useful according to the invention preferably has a backbone selected from the group of a polyenes, such as polymers of monoolefins and diolefins, e.g. polypropylene, e.g. high-crystalline polypropylene (HCPP), polybut-1-ene, poly-4-methylpent-1-ene, polyisoprene or polybutadiene, as well as polymers of cycloolefins, e.g. cyclopenten or norbornene, polyethylene (optionally crosslinked), e.g. high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE) and ultra-low density polyethylene (ULDPE), or mixtures of two or more of the polymers just mentioned, e.g. mixtures of polypropylene with polyisobutylene, with polyethylene (for example PP/HDPE or PP/LDPE) or mixtures of different types of polyethylene (e.g. LDPE/HDPE), copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexane copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide, as well as polymers of ethylene with propylene and a diene, such as hexadiene, dicyclopentadiene or ethylidene-norbornene; and mixtures of such copolymers with one another or with other polymers mentioned above, for example poly(propylene/ethylene-propylene) copolymers, LDPE/ethylene-vinyl acetate copolymers (EVA), LLDPE/EVA) or the like;
or polymers based on styrene polymerisation alone, such as poly(styrene) (PS), e.g. syndiotactic poly(styrene) (sPS), or HIPS (high impact poly(styrene));
or styrene comprising polymers, such as ABS (acrylonitrile-butadiene-styrene polymers), SBS (styrene-butadiene-styrene triblock copolymers) or it's hydrogenated analogue SEBS, SAN (styrene-acrylonitrile copolymers), or ASA (acrylonitrile-acrylate elastomer-styrene copolymers, also acrylonitrile-styrene-acrylate), or mixtures of two or more thereof, including polyolefin elastomers, such as ethylene-propylene-diene monomer copolymers (EPDM), copolymers of ethylene with higher alpha-olefins (such as ethylene-octene copolymers), polybutadiene, polyisoprene, styrene-butadiene copolymers, hydrogenated styrene-butadiene copolymers, styrene-isoprene copolymers, hydrogenated styrene-isoprene copolymers and the like (see also below for the definition of TPOs).

These backbones are grafted (and thus modified) with an unsaturated carboxylic acid, e.g. an unsaturated monocarboxylic acid, such as acrylic acid, methacrylic acid or cyanoacrylic acid, or an unsaturated di-carboxylic acid, such as maleic acid or a C1-C3-mono- or -di-substituted or aryl (e.g. C6-C12-aryl) substituted maleic acid, such as 2-methyl maleic acid, 2-ethyl-maleic acid, 2-phenyl-maleic acid, or 2,3-dimethyl maleic acid, fumaric acid, or a reactive precursor form thereof, such as an anhydride, where the grafting may also take place with more than one of these monomers. The grafting can especially also take place with an ester of the mentioned mono- or dicarboxylic acids, e.g. an ester with a $C_1$-$C_{12}$-alcohol, such as methanol or ethanol, or with a vinyl aromatic compound, especially styrene or a styrene derivative as defined in the preceding paragraph for polystyrene or styrene comprising polymers. Also grafting with two or more monomers selected from the group consisting of an unsaturated carboxylic, an ester thereof and a vinyl aromatic compound is included in the scope of the present invention.

The method of manufacture for them can, for example and preferably, follow the methods described in or follow methods analogous to those described in WO 2004/048426 and/or WO 02/093157, that is, by a solid phase synthesis. These two documents are therefore incorporated by reference herein for the purpose of the manufacturing methods described therein. However, also other methods known in the art are possible, e.g. melt- or solvent-based preparation methods such as reactive extrusion or solvent impregnation followed by thermal treatment or reactive extrusion.

The monomers used for grafting are preferably free of epoxy and fluoro substituents.

Especially preferred are maleic anhydride grafted polymers sold under the tradenames Fusabond® (E.I. du Pont de Nemours and Company, Wilmington, Del., USA) or Ceramer® (Baker Petrolite, Baker Hughes Company, Sugar Land, Tex., USA), especially those given in the Examples.

The composition used for forming an article according to the invention preferably comprises a grafted polymer as described herein in an amount (by weight) of 0.2 to 40%, more preferably from about 0.5 to about 30% or preferably to about 25%, yet more preferably from about 1 to about 18%, e.g. from about 2 to about 10% by weight, based on the weight of the composition.

The size of the grafted polymer particles can e.g. be in the range from about 0.1 to about 100 μm, e.g. from about 0.2 μm to about 50 μm, such as from about 0.5 μm to about 30 μm (mean size as measured e.g. by electron microscopy—preferably the size distribution is such that more than 50, more preferably more than 75% of the particles (by weight) are within ±50% of the mean value).

A friction reducing agent used according to the invention is preferably selected from the group of fluoropolymers, such as PTFE (polytetrafluoroethylene, e.g. sold by Du Pont de Nemours under the tradename Teflon®), PFA (perfluoroalkoxy polymer resin, e.g. sold by Du Pont under the tradename Teflon®), FEP (fluorinated ethylene-propylene (a copolymer of hexafluoropropylene and tetrafluoroethylene), e.g. sold by DuPont under the tradename Teflon®), ETFE (polyethylene-tetrafluoroethylene, e.g. sold under the tradenames Tefzel® by Du Pont or Fluon® by Asahi Glass Co., Ltd, Tokyo, Japan)), PVF (polyvinylfluoride, e.g. sold under the tradename Tedlar® by Du Pont), ECTFE (polyethylenechlorotrifluoroethylene, e.g. sold under the tradename Halar® from Solvay Solexis/Solvay Advanced Polymers GmbH, Dusseldorf, Germany), PVDF (polyvinylidene fluoride, e.g. sold under the tradename Kynar® from Arkema Inc, Philadelphia, USA), PCTFE (polychlorotrifluoroethylene, e.g. sold under the tradename Kel-F® by 3M. St. Paul, Minn., USA, or Neoflon® by Daikin Industries Ltd., Osaka, Japan, also known as CTFE), FFKM (a perfluoroelastomer sold e.g. under the tradenames Kalrez® by Du Pont, Tecnoflon® by Solvay Solexis), FPM/FKM (fluoro elastomers e.g. sold under the tradenames Viton® from Ralicks Industrie- and Umwelttechnik, Rees-Haldern, Germany, or Tecnoflon®, Solvay Solexis); graphite, graphene, tungsten sulphide, molybdenum sulphide and boron nitride, or
a mixture of two or more such agents, e.g. a mixture of polytetrafluoroethylene and graphite which are also preferred as sole friction reducing agent, respectively.

The composition used for forming an article according to the invention preferably comprises a friction reducing agent as described herein in an amount (by weight) of 0.1 to 10%, more preferably from about 0.2 to about 5% or preferably from about 0.3 to about 3%, by weight, respectively, based on the weight of the composition.

The size of the friction reducing agent particles can, without meaning a limitation, e.g. be in the range from about 0.1 to about 100 μm, e.g. from about 0.2 μm to about 50 μm, such as from about 0.5 μm to about 30 μm (mean size as measured e.g. by electron microscopy—preferably the size distribution is such that more than 50, more preferably more than 75% of the particles (by weight) are within ±50% of the mean value).

An unsaturated fatty acid amide is preferably a derivative of an unsaturated fatty acid having e.g. from about 10 to about 36 carbon atoms in (otherwise preferably N-unsubstituted) amide form, inclusively, e.g. the amide of an acid of the formula

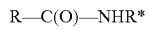

wherein R is an unsaturated alkyl group having from 10 carbon atoms to 26 carbon atoms and R* is an unsaturated alkyl group having from 10 to 26 carbon atoms or preferably hydrogen, such as oleamide, erucamide, linoleamide, or mixtures of two or more such amides.

Erucamide is one preferred unsaturated acid amide.

The composition used for forming an article according to the invention preferably comprises an unsaturated fatty acid amide as described herein in an amount (by weight) of 0.1 to 1%, more preferably from about 0.2 to about 0.5% or preferably from about 0.2 to about 0.4%, by weight, based on the weight of the composition.

Improving the scratch resistance means especially that the scratch resistance is improved (augmented) by comparison according to a method as described in the Examples.

A rubber modified polymer (especially a rubber modified polyolefin) is preferably a mixture of a polymer, especially a polyolefin, and a rubber-like component.

As polymer or polyolefin, polymers or polymer mixtures appropriate for melt mixing are preferred. Among the possible polymers, the following may be mentioned paradigmatically: a styrene comprising polymer, such as ABS (acrylonitrile-butadiene-styrene polymers), SBS (styrene-butadiene-styrene triblock copolymers) or it's hydrogenated analogue SEBS, SAN (styrene-acrylonitrile copolymers), ASA (acrylonitrile-acrylate elastomer-styrene copolymers, also acrylonitrile-styrene-acrylate), a polyester, for example derived from dicarboxylic acids and dialcohols and/or from hydroxycarboxylic acids or the corresponding lactones such as such as PBT (poly(butylene terephthalate), PET (poly(ethylene terephthalate), poly-1,4-dimethylolcyclohexane terephthalate, polyhydroxybenzoates, copolyether ester or UPES (unsaturated polyesters), PA (polyamides, e.g. polyamides derived from diamines and dicarboxylic acids and/or from aminocarboxylic acids or the corresponding lactams, such as polyamide 4, polyamide 6, polyamides 6/6, 6/10, 6/9, 6/12, 4/6, 66/6, 6/66, polyamide 11, polyamide 12, partially aromatic (co)polyamides, for example polyamides based on an aromatic diamine and adipic acid, polyamides prepared from an alkylene diamine and iso- and/or terephthalic acid and copolyamides thereof, copolyether amides, copolyester amides and the like), TPU (thermoplastic elastomers on urethane basis), PS (poly(styrene)), HIPS (high impact poly (styrene)), PC (polycarbonates), as poly(aromatic carbonate)s or poly(aliphatic carbonate)s, e.g. based on bisphenol A and "carboxylic acid" units or other bisphenols and/or dicarboxylic acid units as comonomers, PC/ABS (polycarbonate/acrylonitrile-butadiene-styrene blend), ABS/PBT (acrylonitrile-butadiene-styrene/poly(butylenes terephthalate) blend), PVC (poly(vinyl chloride)); PVC/ABS (poly(vinyl chloride)/acrylonitrile-butadiene-styrene polymer), PVC/ASA (poly (vinyl chloride)/acrylonbitrile-styrene-acrylate), PVC/acrylate (acrylate-modified PVC) and ionomers (copolymerisates of an ionized (at least partially) and an electrically neutral monomer).

In one preferred example, the polymer substrate is a polyolefin (e.g. High Crystalline PP), PC/ABS, ABS, a polyamide, such as PA-6, or a polyolefin rubber or TPE, or for example a polymer as mentioned specifically in the Examples.

Examples of polyolefins are: Polymers of monoolefins and diolefins, e.g. polypropylene, especially a PP block copolymer, random copolymer or, in certain cases, a PP homopolymer e.g. high-crystalline polypropylene (HCPP), polybut-1-ene, poly-4-methylpent-1-ene, polyisoprene or polybutadiene, as well as polymers of cycloolefins, e.g. cyclopenten or norbornene, polyethylene (optionally crosslinked), e.g. high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE) and ultra-low density polyethylene (ULDPE), or mixtures of two or more of the polymers just mentioned, e.g. mixtures of polypropylene with polyisobutylene, with polyethylene (for example PP/HDPE or PP/LDPE) or mixtures of different types of polyethylene (e.g. LDPE/HDPE), copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexane copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide, as well as terpolymers of ethylene with propylene and a diene, such as hexadiene, dicyclopentadiene or ethylidene-norbornene; and mixtures of such copolymers with one another or with other polymers mentioned above, for example poly (propylene/ethylene-propylene) copolymers, LDPE/ethylene-vinyl acetate copolymers (EVA), LLDPE/EVA or the like.

For example, appropriate polyolefins are as described in WO 2006/003127 (Ciba).

In accordance with the present invention, the preferred polypropylene may be homopolypropylene, or copolymers of propylene, or blends thereof. Copolymers may include two or more monomeric units, and are most preferably random copolymers of propylene and an α-olefin having 2 or from 4 to about 20 carbon atoms. There is no particular limitation on the method for preparing this propylene polymer. However in general, the polymer is a propylene homopolymer obtained by homopolymerization of propylene in a single stage or multiple stage reactor. Copolymers may be obtained by copolymerizing propylene and an α-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

The preferred propylene polymer of the present invention may generally have greater than about 25% crystallinity, preferably greater than about 35%, and most preferably greater than about 50% crystallinity in nature based on a density of isotactic polypropylene of 0.936 g/cm3. It may be random or block copolymers. The propylene polymer may be a combination of a homopolypropylene, and/or a random, and/or a block copolymer as described herein.

When the above propylene polymer is a random copolymer, the percentage of the copolymerized α-olefin in the copolymer is, in general, up to about 7 mole %, preferably about 1 to about 5 mole %, most preferably 2 to about 4 mole %. The preferred α-olefins contain 2 or from 4 to about 12 carbon atoms and most preferably contain from 4 to about 8 carbon atoms. The most preferred α-olefin is ethylene, other preferred α-olefins include, for instance, butene, hexene and octene, which in a first embodiment of the invention is not understood as limitation. One, or two or more α-olefins can be copolymerized with propylene.

Exemplary α-olefins may be selected from the group consisting of ethylene, butene-1, pentene-1,2-methylpentene-1, 3-methylbutene-1, hexene-1,3-methylpentene-1,4-methylpentene-1,3,3-dimethylbut-1-ene, hept-1-ene, hex-1-ene, methylhex-1-ene, dimethylpent-1-ene trimethylbut-1-ene, ethylpent-1-ene, oct-1-ene, methylpent-1-ene, dimethylhex-1-ene, trimethylpent-1-ene, ethylhex-1-ene, methylethylpent-1-ene, diethylbut-1-ene, propylpent-1-ene, dec-1-ene, methylnon-1-ene, non-1-ene, dimethyloct-1-ene, trimethylhept-1-ene, ethyloct-1-ene, methylethylbut-1-ene, diethylhex-1-ene, dodec-1-ene and hexadodec-1-ene. If the content is too high, the amount of a non-crystalline component is increased, and as a result, the blend will tend to produce a molded product which is "sticky" or "tacky." The appropriate amount to avoid this can easily be found, however, for those skilled in the art. It should be noted that for certain applications such "sticky" or "tacky" feel may be required and, thus, could be of use for the present invention, despite not preferred.

The rubber-like component of the polypropylene blend is essentially a high molecular weight, non-crystalline or low-crystalline component, for example containing no greater than about 5 to about 10 weight % crystalline material. The rubber-like component generally can have, for example, a molecular weight of greater than about 100,000, and it can generally, for example, be present in an amount up to about 50 weight % (in some cases even more, e.g. up to 70 weight %), preferably in the range of about 2 to about 50 weight %, more preferably about 5 to about 40 weight %, and most preferably about 10 (e.g. 20) to about 30 weight % relative to the blend. The rubber-like component is preferably added to the polypropylene in an amount sufficient to improve the impact resistance, but not substantially deteriorate the modulus of the resultant molded article. The latter can be adjusted by the use of fillers such as talc or glass fibers, to only mention two examples here, or the like.

The rubber-like polyolefin may be ethylene-α-olefin copolymer rubbers wherein the α-olefin contains from 3 to about 20 carbon atoms, and ethylene is present in an amount up to about 80 mole %, preferably in the range of about 20 to about 80 mole %, more preferably in the range of about 40 to about 60 mole %. The most preferred rubber compound to blend with the propylene polymer is ethylene propylene random copolymer. Rubber copolymers may also be ethylene-α-olefin-non-conjugated diene copolymers, wherein the dienes include for example cyclopentadiene, hexadiene, octadiene, norbornadiene or the like. Rubbers may also be natural rubber; isobutene rubber, butadiene rubber, polyisoprene, 1,2-polybutadiene, styrene-butadiene random copolymer rubber, chloroprene rubber, nitrile rubber, styrene-isoprene copolymer, styrene-isoprene-styrene block copolymer rubber, ethylvinyl-acetate, hydrogenated styrene-butadiene copolymers, hydrogenated styrene-isoprene copolymers, or a mixture of two or more thereof. Ethylenic copolymer rubbers can be used alone or as a mixture thereof.

Mixtures of polyolefins and rubber-like components according to the invention are generally known as thermoplastic polyolefins (TPO) or thermoplastic elastomers (TPE) depending on the rubber content. TPO's are basically blends of the polyolefins mentioned above as polyolefins with rubber-like components in the form of impact modifiers, such as ethylene-propylene-diene monomer copolymers (EPDM), copolymers of ethylene with higher α-olefins (such as e.g. ethylene-octene copolymers), polybutadiene, polyisoprene, styrene-butadiene copolymers, hydrogenated styrene-butadiene copolymers, styrene-isoprene copolymers, hydrogenated styrene-isoprene copolymers and the like. These blends are commonly referred to as TPOs (thermoplastic polyolefins). For example, an appropriate TPO has from about 10 to about 90 weight percent of propylene homopolymer, copolymer or terpolymer, and about 90 to about 10 weight percent of an elastic copolymer of ethylene and a $C_3$-$C_8$-alpha-olefin. Such TPO's can be prepared in a reactor process or by compounding, i.e. melt-mixing, as well as by sequential combination of both.

For example, appropriate TPOs are disclosed in U.S. Pat. No. 6,048,942 (Montell). Especially preferred as TPO are such sold under the tradename Daplen® (Borealis AG, Vienna, Austria), especially those mentioned in the Examples.

Polyolefins and rubber modified polyolefins may not solely be the polymer substrate of the present compositions, though they are preferred. Not excluded as polymer substrates are copolymers of polyolefins with other polymers or blends of polyolefins with other polymers as described above.

The rubber modified polyolefin according to the invention is preferably present in a complete polymer composition, based on weight, in 20 to 98%, more preferably 40 to 98%, e.g. 60 to 98%

The molecular weight of the rubber-like component is generally greater than about 100,000, however, the amount greater than 100,000 is not critical provided that the polypropylene-rubber blend can be kneaded in an extruder, blender, or mixing process. Too low of a molecular weight can be critical since it would create difficulties in blending the rubber with the polypropylene.

In addition to the components already mentioned, one or more further customary additives may be present in the polymer compositions according to the present invention:

The polymer compositions (polymer substrates) of the present invention thus optionally contain from about 0.01 to about 5%, preferably from about 0.025 to about 2%, and especially from about 0.1 to about 1% by weight of one or more further additives, such as the compounds listed below, and optionally (or preferably) in addition up to 40%, e.g. 0 to 35%, for example 10 to 25% or 25 to 40%, of a filler such as talc (talcum), Wollastonite, glass fibres, carbon fibres, calcium carbonate, or mixtures thereof, based on the weight of the composition.

All weight percent data, if not expressly stated otherwise, relate to the final (polymer) composition containing all its components, respectively.

More preferably, the combinations useful in any embodiment according to the invention comprise rubber-modified polypropylene, especially TPO, in an amount of from 20 to 98%, more preferably 40 to 98%, e.g. 60 to 98%, a filler, especially talc, in an amount of form 0 to 40%, e.g. 10 to 25 or 25 to 40%, grafted polymer, especially as described above or below as preferred, in an amount of from 0.5 to 3%, unsaturated fatty acid amide, especially erucamide, oleamide or a mixture thereof, in an amount of from 0.01 to 1% and friction reducing agent, especially PTFE, graphite, molybdenum or tungsten sulphide, or a mixture of two or more thereof, in an amount of from 0.01 to 1% by weight, respectively, based on the weight of the composition.

Yet more preferably, the combinations useful in any embodiment according to the invention comprise rubber-modified polypropylene, especially, TPO, 20 to 98%, more preferably 40 to 98%, e.g. 60 to 98%, a filler, especially talc, 0 to 40%, e.g. 10 to 25 or 25 to 40%, grafted α-olefin polymer, especially PP grafted with maleic anhydride (PP-graft-MA) or PE grafted with maleic anhydride (PE-graft-MA) 0.5 to 3%, unsaturated fatty acid amide, 0.2 to 1% (preferably 0.1 to 0.45%) and friction reducing agent, especially PTFE, PFA, FEP, ETFE, ECTFE, PVDF, PCTFE, CTFE, FFKM, FPM/FKM and/or graphite and/or metal sulphides in an amount of 0.2 to 1% by weight, respectively, based on the weight of the composition.

Most preferably, the combinations useful in any embodiment according to the invention comprise rubber-modified polypropylene 20 to 98%, e.g. 60 to 98 or 40 to 60%, a filler, especially talc 0 to 40%, e.g. 10 to 25 or 25 to 40%, grafted α-olefin polymer, especially PP grafted with maleic anhydride (PP-graft-MA) or PE grafted with maleic anhydride (PE-graft-MA) 0.5 to 3%, erucamide, oleamide or a mixture thereof 0.2 to 0.5% (preferably 0.1 to 0.45%) and as friction reducing agent polytetrafluoroethylene and/or graphite and/or metal sulphide in an amount of 0.2 to 1% by weight, respectively, based on the weight of the composition.

The combinations useful mentioned in the preceding and following paragraphs can be used in the definition in any embodiment of the invention, also for the definition of resulting polymer mixtures and end products.

The invention relates especially to the embodiments mentioned in the claims, more especially in the dependent claims. The claims are therefore included herein by reference.

Further important embodiments of the invention are characterized as follows:

The invention especially relates to an embodiment of the invention as described hereinbefore or hereinafter, in which the rubber modified polymer is a mixture of a polypropylene and a rubber-like component. Preferably, the polypropylene is selected from the group consisting of a PP block copolymer, random copolymer or, in certain cases, a PP homopolymer, or binary, ternary or even quaternary mixtures thereof. Preferably, the rubber-like component of the polypropylene blend is an ethylene-α-olefin copolymer rubber, especially wherein the α-olefin contains from 3 to about 20 carbon atoms, and ethylene is present in an amount up to about 80 mole %; an ethylene propylene random copolymer; an ethylene-α-olefin-non-conjugated diene copolymer, wherein the dienes include for example cyclopentadiene, hexadiene, octadiene or norbornadiene; natural rubber; isobutene rubber; butadiene rubber; polyisoprene, 1,2-polybutadiene; styrene-butadiene random copolymer rubber; chloroprene rubber; nitrile rubber; styrene-isoprene copolymer; styrene-isoprene-styrene block copolymer rubber; ethylvinyl-acetate; hydrogenated styrene-butadiene copolymers; hydrogenated styrene-isoprene copolymers; or a mixture of two or more thereof. Alternatively, the rubber-like component is an ethylene-based polymer, particularly but not exclusively ethylene-propylene (EP), ethylene-butene (EB), ethylene-hexene (EH), or ethylene-octene (EO) polymers and/or mixtures thereof. Such ethylene-based rubber-like polymers are readily available on the market, of particular relevance are grades named Engage® (EP, EB, EO, available from Dow Chemical).

Most preferably, the rubber modified polymer used in any embodiment of the invention described herein is a TPO.

The grafted polymer in any embodiment of the invention is preferably especially PP grafted with maleic anhydride (PP-graft-MA) or PE grafted with maleic anhydride (PE-graft-MA), or a mixture of two or more thereof.

One or more further additives may be present, e.g. from those and in the amounts given above or below. For example, nucleating agents may be present.

In another embodiment of the invention, in all other embodiments the friction reducing agent is preferably PTFE or graphite, or is a metal sulphide, e.g. molybdenum sulphide or tungsten sulphide, or is a mixture of two or more of these; and the fatty acid amide is erucamide, oleamide or a mixture thereof.

The invention also relates, in one embodiment, to a polymer article, manufactured by a method or process according to the invention and especially the claims.

The invention also relates to a process for the manufacture according to any embodiment herein of automotive interior parts, especially for instrument panels or interior trims, further comprising forming the respective part(s).

The invention also relates to a process for the manufacture according to any embodiment herein of automotive exterior parts, especially for bumpers or exterior trims, further comprising forming the respective part(s).

In one embodiment, the invention also relates to a composition obtainable according to a method, use or process as herein described, comprising PP-graft-MA, erucamide and graphite, preferably in the amounts indicated as preferred herein. Alternatively, the same composition is preferred in which erucamide is replaced with or combined with oleamide.

In one embodiment, the invention also relates to a composition obtainable according to a method, use or process as herein described, comprising PE-graft-MA, erucamide and graphite, preferably in the amounts indicated as preferred herein. Alternatively, the same composition is preferred in which erucamide is replaced with or combined with oleamide.

In yet another embodiment, the invention also relates to a composition obtainable according to a method, use or process as herein described, comprising PP-graft-MA, erucamide and PTFE, preferably in the amounts indicated as preferred herein. Alternatively, the same composition is preferred in which erucamide is replaced with or combined with oleamide.

In yet another embodiment, the invention also relates to a composition obtainable according to a method, use or process as herein described, comprising PE-graft-MA, erucamide and PTFE, preferably in the amounts indicated as preferred herein. Alternatively, the same composition is preferred in which erucamide is replaced with or combined with oleamide.

In yet another embodiment, the invention also relates to a composition obtainable according to a method, use or process as herein described, comprising PP-graft-MA, erucamide and a metal sulphide, especially molybdene and/or tungsten sulphide, preferably in the amounts indicated as preferred herein. Alternatively, the same composition is preferred in which erucamide is replaced with or combined with oleamide. Alternatively, the same composition is preferred in which erucamide is replaced with or combined with oleamide.

In yet another embodiment, the invention also relates to a composition obtainable according to a method, use or process as herein described, comprising PE-graft-MA, erucamide and a metal sulphide, especially molybdene and/or tungsten sulphide, preferably in the amounts indicated as preferred herein. Alternatively, the same composition is preferred in which erucamide is replaced with or combined with oleamide.

The manufacture of the polymer-based products as mentioned herein preferably, as additional process step, takes place by injection moulding or by blow moulding.

In the uses or methods according to the invention, the friction reducing agent, the grafted polymer, the rubber modified polyolefin, the unsaturated acid amide and optionally one or more additives, and optionally one or more fillers, e.g. talc, Wollastonite, calcium carbonate, glass fibres, and the like, are mixed in any order acceptable from the perspective of the skilled person, or as appropriate (e.g. in view of technical equipment limitations or the like), especially in a melt compounding process.

Generally, the compositions are preferably formed by melt mixing of polypropylene compositions with the combination of friction reducing agent, grafted polymer, unsaturated acid amide and optional additives and/or fillers according to the invention.

Fillers such as talc and Wollastonite and other processing additives may also be included in the compositions according to the invention. Other customary and/or functional additives common in the polymer field may be present as well.

The invention thus allows for the manufacture of articles with high scratch resistance having an attractive and useful surface for various types of products, e.g. in the automotive field of endeavour.

The main substrates (meaning basis materials for articles) for which improved scratch resistance remain an ever-existing need, are substrates like talc-filled PP copolymer or PP based TPE (skin). As the composition of these materials can vary in a wide range, it is clear scratch resistance (and also low gloss) depend on the resin used, the type and content of elastomer and talc, stabilizers and co-additives as well as pigments and other fillers. In addition also the processing conditions and the surface texture (grain) play an important role.

These new materials are intended to be used (at least preferably) without any coatings and may be used for both positive (grained during skin fabrication) and negative (grained in the mould tool) forming process.

The polymeric compositions formed in accordance with the present invention exhibit, besides improved scratch resistance, and also other favorable properties, such as good or even improved mechanical properties.

The present invention thus especially includes a method or process for improving the scratch resistance of a polymer article (the term article including herein a flat product such as a film or a skin, or a three-dimensional product manufactured through e.g. injection or blow moulding) and/or for producing polymer article (polymer end product), comprising adding (especially by melt mixing) to the bulk starting rubber modified polyolefin mixture a friction reducing agent, in combination with a grafted polymer, and in addition an unsaturated fatty acid amide, for improving the scratch resistance and, optionally, in addition, for diminishing the exudation of components and/or reducing the tendency to evolve stickiness of a rubber modified polyolefin during light exposure (especially in comparison to an otherwise identical mixture which, however, lacks the addition of the friction reducing agent, respectively), and then forming the article. Preferably, an amount of friction reducing agent and in addition a grafted polymer and an unsaturated acid amide are added that improve the scratch resistance (and optionally in addition for diminishing the exudation of components and/or reducing the tendency to evolve stickiness of the rubber modified olefin upon light exposure) in comparison to the composition lacking said additions (but which is otherwise identical). In addition, one or more further customary additives with e.g. different purposes may be added. Preferably, also the conditions of the manufacture of the polymer article to be produced are chosen so that the addition of the friction reducing agent in addition to a grafted polymer and an unsaturated acid amide, especially the amount and/or the type of the former, in combination with the chosen process conditions leads to an improved scratch resistance compared to an article that has an otherwise identical composition but that lacks the addition of a friction reducing agent.

A polymer end product is a polymer article or polymer product (the term article including herein a flat product such as a film or a skin, or a three-dimensional product manufactured e.g. by injection or blow moulding), where the highest level of interest is seen in the automotive field, e.g. for interior applications is seen in instrument panel structures, consoles, other interior trim parts, instrument panels as such and door panel skins, but also seat components, handles, cargo liners, engine compartment components or the like. But also in applications outside the automotive field, e.g. for machine housings, appliances, consumer or electronic devices, outdoor vehicles and devices or any other parts needing good scratch resistance, preferably also good mechanical strength and favourable optics, such as low gloss, or in the appliances and packaging markets.

The thermoplastic resin composition according to the present invention can be formed into a variety of articles by known methods such as thermoforming, extrusion, processing of fibrous substrates, sheet forming, or especially moulding, e.g. extrusion moulding, vacuum moulding, profile moulding, foam moulding, injection moulding, blow moulding, compression moulding, rotational moulding, or the like.

Generally, for each embodiment of the invention 1, 2 or more up to all more general terms within the present disclosure may be replaced by more specific definitions given hereinbefore and hereinafter to give further advantageous embodiments of the invention.

Where the indefinite article "a" or "an" is used, this is intended to include "at least one", e.g. "one or more", where "the" is used referring to a feature with an indefinite article, this is also intended to mean "at least one".

The polymeric compositions formed in accordance with the present invention exhibit improved scratch resistance, in addition appropriate gloss and appropriate other physical properties.

Where "about" is used, this is intended to mean that a slight variation (often unavoidable in technical practice) of the numerical value given after "about" is possible, e.g. in the range of ±10%, for example ±3%, of the given value is possible. Also where numbers are given without "about", within the present disclosure this is to be understood as meaning "about" the numeric values, preferably as just defined, most preferably "exactly".

"Improving" the scratch resistance means especially increasing or augmenting the scratch resistance, that is, making the resulting material or product less scratch sensible. Corresponding examples for methods for determination of the scratch resistance are described in the examples.

In addition, the process conditions in the methods or uses according to the invention may be modified so as to allow the improvement of scratch resistance in comparison to conditions where no reduction of gloss is possible. Among the parameters that may be modulated are, e.g., the melt temperature during compounding and e.g. injection moulding, the throughput, i.e. the rate of moving the material into/through the device forming the desired product (e.g. a form for moulding, an extruder, nozzles or the like), the temperature for filling a form for moulding (especially the temperature of the mould before introduction), the temperature of the forming device, the temperature of the processing to the solid product, and the like. However, the invention is not limited to such specific conditions. The skilled person, based also on the evidence in the Examples, will conveniently be able to devise appropriate process conditions by a very limited number of experiments. For example, in the case of forming an article by moulding, the temperature of the mould can be selected in the range from about 20 to about 60° C., e.g. in the range from 20 to 30° C., the temperature of injection can preferably be chosen in the range from 200 to 280° C., e.g. in the range from 200 to 250° C., and the injection speed under the equipment conditions given in the Examples can preferably be chosen in the range from 5 mm/sec to 120 mm/sec, e.g. from about 10 to about 100 mm/sec, at least as a starting point if a further experiment should be required. Other appropriate conditions are given in the Examples, e.g. mixing is possible in a mixer and then compounding to pellets in an extruder e.g. at 190 to 230° C., followed by injection moulding e.g. at about 200 to 250° C.

Among the further additives that can be added, the following may be present, alone, or in combination of two or more:
1. Antioxidants
1.1. Alkylated monophenols, for example 2,6-di-tert-butyl-4-methylphenol, 2-tert-butyl-4,6-di-methylphenol, 2,6-di-tert-butyl-4-ethylphenol) 2,6-di-tert-butyl-4-n-butylphenol, 2,6-di-tert-butyl-4-isobutylphenol, 2,6-dicyclopentyl-4-methylphenol, 2-(oc-methylcyclohexyl)-4,6-di-methylphenol, 2,6-dioctadecyl-4-methylphenol, 2,4,6- tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol or mixtures of two or more thereof.

1.2. Alkylthiomethylphenols, for example 2,4-dioctylthiomethyl-6-tert-butylphenol]-2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydro-oxyphenyl) adipate.

1.4. Tocopherols.

1.5. Hydroxylated Thiodiphenyl Ethers.

1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,21-methylenebis(4-methyl-6-cyclohexylphenol)l 2,2'-methylenebis(6-nonyl-4-methyl phenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methyl phenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate], 1,1-bis-(3J5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydraxy-2-methylphenyl)pentane.

1.7. Benzyl compounds, for example 3,5,3",5,-tetra-tert-butyl-4-4'-dihydroxydibenzyl ether.

1.8. Hydroxybenzylated malonates.

1.10. Other Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzyl phosphonate, dioctadecyl-3,5-di-tert-butyl-4-hydroxybenzylphosphonate, dioctadecyl-5-tert-butyl-hydroxy-5-methylbenzylphosphonate, the calcium salt of the monoethyl ester of 3,5-di-tert-butyl-4-hydroxybenzylphosphonic acid.

1.12. Acylaminophenols.

1.13. Esters of β-(3,5-di-tert-butyl-4-hydroxyphenyl)propionic acid with mono- or polyhydric alcohols.

1.14. Esters of β-(5-tert-butyl-4-hydroxy-3-methylphenyl) propionic acid with mono- or poly hydric alcohols.

1.15. Esters of β-(3,5-dicyclohexyl-4-hydroxyphenyl)propionic acid with mono- or polyhydric alcohols.

1.16. Esters of 3.5-di-tert-butyl-4-hydroxyphenyl acetic acid with mono- or polyhydric alcohols.

1.17. Amides of β-(3.5-di-tert-butyl-4-hydroxyphenyl)propionic acid.

1.18. Ascorbic Acid (Vitamin C).

1.19. Aminic Antioxidants.

2. UV Absorbers and Light Stabilizers 2.1. 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methyl-phenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methyl-phenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-,phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)-ethylphenyl)-2H-benzotriazole, dodecylated 2-(2-hydroxy-5-methylphenyl)-2H-benzotriazole, 2-(3-tert-butyl-2-hydroxy-5-(2-octyloxycarbonylethyl) phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-tert-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumyl phenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzo-triazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octyl-phenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octyl-phenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenyl-sulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2'J41-tri hydroxy and 2l-hydroxy-4,4'-dimethoxy derivatives.

2.3. Esters of substituted and unsubstituted benzoic acids, as for example 4-tert-butyl phenyl salicylate, phenyl salicylate, octyl phenyl salicylate, dibenzoyl resorcinol, bis(4-tert-butyl-benzoyl)resorcinol, benzoyl resorcinol, 2,4-di-tert-butylphenyl-3,5-di-tert-butyl-4-hydroxybenzoate, hexadecyl-S.S-di-tert-butyl-4-hydroxybenzoate, octadecyl 3,5-di-tert-butyl-4-hydroxybenzoate, 2-methyl-4,6-di-tert-butylphenyl-3,5-di-tert-butyl-4-hydroxybenzoate.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR® 25, dimethyl p-methoxybenzylidenemalonate (CAS#7443-25-6), and Sanduvor® PR® 31, methylpiperidin-4-yl) p-methoxybenzylidenemalonate (CAS #147783-69-5).

2.5. Nickel compounds, for example nickel complexes of 2,2'-thio-bis-[4-(1,1,3,3-tetramethylbutyl)phenol], nickel dibutyldithiocarbamate, nickel salts of the monoalkyl esters, nickel complexes of ketoximes, or nickel complexes of 1-phenyl-4-lauroyl-5-hydroxypyrazole, with or without additional ligands.

2.6. Sterically hindered amine stabilizers, for example 4-hydroxy-2,2,6,6-tetramethylpiperidine, 1-allyl-4-hydroxy-2,2,6,6-tetramethylpiperidine, 1-benzy-4-hydroxy-2,2,6,6-tetramethylpiperidine, bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethyl-piperidyl) succinate, linear or cyclic condensates of N,N'-bis-(2,2,6,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6J6-tetramethylpiperidyl)-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4,5]Idecane-2,4-dione, 3-dodecyl-1-(2,2,6,6-tetramethyl-4-piperidyl)-pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclo-hexylamino-2,6-dichloro-1,3,5-triazine, a condensation product of 1,2-bis(3-aminopropyl-amino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyl-oxycarbonyl)-2-(4-methoxyphenyl)ethene], N,N'-bis-formyl-N,N1-bis(2,2,6,6-tetramethyl-4-pi-peridyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperi-dyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in U.S. Pat. No. 5,980,783, the relevant parts of which are hereby incorporated by reference, that is compounds of component I-a), I-b), I-c), I-d), I-e), I-f), I-g), I-h), I-i), I-j), I-k) or I-l), in particular the light stabilizer 1-α-1, 1-α-2, 1-b-1, 1-c-1, 1-C-2, 1-d-1, 1-d-2, 1-d-3, 1-e-1, I-f-1, 1-g-1, 1-g-2 or 1-k-1 listed on columns 64-72 of said U.S. Pat. No. 5,980,783.

The sterically hindered amine may also be one of the compounds described in U.S. Pat. Nos. 6,046,304 and 6,297,299, the disclosures of which are hereby incorporated by reference, for example compounds as described in claim 10 or 38 or in Examples 1-12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl)succinate, bis(1-(2-hydroxy-2-methylprop-oxy)-2,2,6,6-tetramethylpiperidin-4-yl) glutarate and 2,4-bis{N-[1-(2-hydroxy-2-methylprop-oxy)-2,2,6,6-tetramethylpiperidin-4-yl]-N-butylamino}-6-(2-hydroxyethylamino)-s-triazine.

2.8. Oxamides.

2.9. Tris-aryl-o-hydroxyphenyl-s-triazines. for example known commercial tris-aryl-o-hydroxy-phenyl-s-triazines and triazines as disclosed in, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chloro-phenyl)-s-triazine, 2,4~bis[2-hydroxy-4-(2-hydroxy-4-(2-hydroxyethoxy)phenyl]-6-(2,4-di-methylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-tri-azine, 2,4-bis(2,4-dimethylphenyl)-6-[2-hydroxy-4-(3-benzyloxy-2-hydroxypropyloxy) phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonyliso-propylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis

[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-do-clecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal Deactivators.

4. Phosphites and phosphonites, for example triphenyl phosphite, diphenyl alkyl phosphites, phenyl dialkyl phosphites, tris(nonyl phenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris-(tert-butylphenyl)pentaerythritol diphosphite, tristearyl sorbitol triphosphite, tetrakis(2,4-d i-tert-butylphenyl) 4,4'-biphenylene diphosphonite, 6-isooctyloxy-2,4,8,10-tetra-tert-butyl-dibenzo[d,f][[1,3,2]dioxaphosphepin, 6-fluoro-2,4,8,10-tetra-tert-butyl-12-methyl-dibenzo[d,g][1,3,2]dioxaphosphocin, bis(2,4-di-tert-butyl-6-methylphenyl)methyl phosphite, bis(2,4-di-tert-butyl-6-methylphenyl)ethyl phosphite, 2,2',2"-nitrilo[triethyltris(3,3,5,5'-tetra-tert-butyl-1,1"-biphenyl'-2,2"-diyl)phosphite], 2-ethylhexyl(3,3",5,5-tetra-tert-butyl-1,1'-biphenyl-2,2'-diyl")phosphite.

5. Hydroxylamines.

6. Nitrones.

7. Amine Oxides.

8. Benzofuranones and Indolinones.

9. Thiosynergists.

10. Peroxide Scavengers.

11. Polyamide Stabilizers.

12. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

13. Nucleating agents, for example inorganic substances such as talcum, metal oxides such as titanium dioxide, magnesium oxide, phosphates, carbonates or sulfates of, preferably, alkaline earth metals; organic compounds such as mono- or poly-carboxylic acids and the salts thereof, e.g. 4-tert-butylbenzoic acid, adipic acid, diphenylacetic acid, sodium succinate or sodium benzoate; polymeric compounds such as ionic copolymers (ionomers). Other nucleating agents include sugar acetals (Millad® family from Milliken Chemical, Spartanburg, USA), also known as clarifying agents, trisamide derivatives as described, for instance, in EP 1592738, WO 2004072168 and US 2007149663, as well as so called hyper nucleating agents (Hyperform® family from Milliken Chemical, Spartanburg, USA). Preferred nucleating agents include so-called hyper nucleating agents, such as, for instance, the calcium salt of 1,2-cyclohexane dicarboxylic acid (available as Hyperform® HPN-20E from Milliken Chemical) and the disodium salt of bicyclo[2.2.1]heptane-2,3-dicarboxylic acid (available as Hyperform® HPN-68 from Milliken Chemical, Spartanburg, USA) and organophosphate derivatives, such as ADKSTAB® NA-11 (available from ADEKA, Japan; main component: sodium 2,2'-methylenebis (4,6-di-tert-butylphenyl)phosphate), ADKSTAB® NA-21 (available from ADEKA, Japan; main component: aluminium-hydroxy-bis[2,2'-methylene-bis(4,6-di-tert-butylphenyl)phosphate]) and ADKSTAB® NA-71 (available from ADEKA, Japan; main component: Lithium 2,2'-methylene-bis(4,6-di-tert-butylphenyl)phosphate), and/or Ciba® IRGASTAB® NA 287 (a proprietary high efficiency nucleating agent available from Ciba AG, Basel, Switzerland). Other nucleating agents of particular interest to the present invention include β-nucleating agents for PP such as, for instance, NJSTAR® TF1 (available from New Japan Chemical, Japan) as well as TNB-5 (a cyclohexyl terephthalamide derivative available from various Chinese suppliers under varying trade names). Yet another nucleating agent of interest to the present invention is the clarifying agent RIKA-CLEAR® PC1 (distributed by Rika, UK), equal to NJSTAR® PC-1 (produced by New Japan Chemical, Japan).

14. Fillers and reinforcing agents, for example calcium carbonate, silicates, glass fibres, carbon fibres, glass bulbs, asbestos, talc, Wollastonite, kaolin, mica, barium sulphate, metal oxides and hydroxides, carbon black, graphite, wood flour and flours or fibres of other natural products (e.g. hemp, kenaf, sisal and the like), synthetic fibres.

15. Dispersing Agents, Such as Polyethylene Oxide Waxes or Mineral Oil.

16. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flame retardants, antistatic agents, clarifiers such as substituted and unsubstituted dibenzylidene sorbitols, benzoxazinone UV absorbers such as 2,2'-p-phenylene-bis(3,1-benzoxazin-4-one), Cyasorb® 3638 (CAS#18600-59-4), and/or blowing agents.

Among the preferred further additives are one or more additives selected from the group consisting of hindered amine light (especially UV) stabilizers, hindered phenols, phosphites, benzofuranone stabilizers and hydroxyphenyl-benzotriazole, hydroxyphenyl-s-triazine or benzophenone ultraviolet light absorbers, fillers, such as talcum and carbon black, and basic co-stabilizers, such as calcium stearate, or nucleating agents or mixtures of two or more thereof.

Preferred nucleating agents to be used as particular additional customary/functional additive according to the present invention, include those described hereinbefore. Of particular interest are so-called hyper nucleating agents, such as Hyperform® HPN-20E or HPN-68 (available from Milliken Chemical, Spartanburg, USA), and/or organophosphate derivatives, such as ADKSTAB® NA-11, NA-21 and NA-71 (available from ADEKA, Japan) and Ciba® IRGASTAB® NA 287 (available from Ciba AG, Basel, Switzerland). Yet other nucleating agents of particular interest include 6-nucleating agents for polypropylene such as, for instance, NJSTAR® TF1 (available from New Japan Chemical, Japan), TNB-5 (available from various Chinese suppliers under varying trade names). Yet another nucleating agent of interest is RIKACLEAR® PC-1 and NJSTAR® PC-1 (available from Rika, UK & New Japan Chemical, Japan, respectively).

Of course, it is also possible, in addition to the combination of a friction reducing agent a grafted polymer and an unsaturated acid amide according to the present invention, to add matting agents, such as talc, polymers comprising one or more epoxide groups, or especially grafted polymers or esterified polymers. This is always comprised in the embodiments of the present invention.

The compositions according to the present invention are also useful for other potential markets besides the (though preferred) automotive applications, e.g. for instrument panel structures, consoles, other interior trim parts, instrument panels as such and door panel skins, but also seat components, handles, cargo liners, engine compartment components or the like, are e.g. for machine housings, appliances, consumer or electronic devices, outdoor vehicles and devices or any other parts needing good mechanical strength and favourable optics, such as low gloss, or in the appliances and packaging markets.

The following Examples illustrate the invention without limiting its scope. Where percentages are given (%), this refers to percent by weight (based on the complete polymer composition), if not explicitly indicated in a different way.

The following methods and techniques are used for testing and characterization of the application properties of produced test samples.

The scratch resistance is evaluated by measuring the colour difference (ΔL value) by means of a spectral photometer Spectraflash SF 600 plus (Datacolor AG, Dietlikon, Switzerland). This measurement corresponds to the difference in brightness of the scratched versus the unscratched polymer surface. The scratches are made with the Scratch Hardness Tester 430 P (Erichsen GmbH & Co. KG, Hemer, Germany) similar to GME 60280 (a scratch resistance test according to General Motors Europe Engineering Standard GME 60280, Issue 2, July 2004) with a metal tip of 1 mm diameter (cylindrical hard metal pen with ball-shaped end) moved at a velocity of 1000 mm/min over the surface with an effective normal force of 15 N and/or 20 N at room temperature.

A second modified scratch test is used, which is similar to GME 60280. Instead of the cross hatch pattern used above, where scratches are made in longitudinal and transversal directions forming a grid with 2 mm distance between the lines (referred in the Examples as "x-cut"), samples are scratched in only one direction with parallel lines of 1.5 mm distance between the lines (referred in the Examples as "length-cut"). Otherwise, the same tip, same velocity and same loads (normal forces) are applied as described above.

The tensile properties are measured according to ISO 527 using a Zwick Z010 universal testing machine (Zwick GmbH & Co. KG, Ulm, Germany) with crosshead speed of 100 mm/min. At least 5 samples are tested for each formulation and average values are calculated. Tensile modulus [MPa] is reported.

The following products used as components in the following Examples are identified by the following trademarks, respectively:

Fusabond P353 resin (old name: Fusabond P MD 353D, E.I. du Pont de Nemours and Company, Wilmington, Del., USA) PP-graft-MA with very high MA graft level Ceramer 67 (Baker Petrolite, Baker Hughes Company, Sugar Land Tex.) PE-graft-MA Atmer SA 1753 (ex-Ciba, now Croda, Snaith Goole, East Yorkshire, England) erucamide Graphite FL 1690 (Grafitbergbau Kaisersberg Ges.m.b.H., St. Stefan ob Leoben) graphite Dyneon TF 2021 (Dyneon LLC, Oakdale Minn.) polytetrafluoroethylene PTFE fine powder Molybdenum-sulphide (Fluka, Sigma Aldrich Chemie GmbH, Buchs, Switzerland) molybdenum-sulphide Tungsten-sulphide (Sigma Aldrich Chemie GmbH, Buchs, Switzerland) tungsten-sulphide Styroflex 2G66 (BASF SE, Ludwigshafen, Germany) SBS styrene-butadiene-styrene copolymer Kraton G1652E (Kraton Polymers LLC, Houston Tex.) SEBS styrene-ethylene/butylene-styrene copolymer Engage 8200 (Dow Chemical Company, Midland Mich.) ethylene-octene copolymer Modiper A4200 (NOF Corporation, Tokyo, Japan) Poly(ethylene-stat-glycidyl methacrylate)-graft-poly-methyl-methacrylate Modiper A5200 (NOF Corporation, Tokyo, Japan) Poly(ethylene-stat-ethylacrylate)-graft-polymethyl-methacrylate.

TPO base resin Daplen EE 013AE (Borealis AG, Vienna, Austria) reactor TPO, newer base resin than Daplen ED012AE with only slight modifications.

TPO base resin Daplen ED 012AE (Borealis AG, Vienna, Austria) reactor TPO; 70% PP homopolymer and 30% PP copolymer with 50% ethylene content; intrinsic viscosity ~2.9 Pas; melt flow index (230° C., 2.16 kg)=35 g/10 min, low emission

EXAMPLE 1

Processing of Injection-Molded Plaques with TPO (Borealis Daplen ED 012AE)

Standard: PP-graft-MA+0.5% fatty acid amide+0.5% graphite, PTFE or metal sulphide In order to evaluate their surface properties and mechanical properties of the antiscratch additives, the products are incorporated in TPO injection molded plaques according to the following procedure:

The TPO Daplen ED012AE (from Borealis AG, Vienna, Austria) in powder form is mixed together with 20% talc (Luzenac A-20; Rio Tinto, Luzenac Europe, Toulouse, France), 1.5% of a carbon black masterbatch (equals 0.5% carbon black concentration), 0.05% calcium-stearate, 0.05% Ciba® IRGANOX® B215 (synergistic antioxidant mixture of a phosphite (tris(2,4-di-(tert)-butyl-phenyl)-phosphate) and a hindered phenol (tetrakis-(methylene-(3,5-di-(tert)-butyl-4-hydrocinnamate))methane, Ciba, Basel, Switzerland) and the products are combined as indicated in table 1. The formulations are mixed in a high speed mixer Mixaco Lab CM 12 (Mixaco, Dr. Herfeld GmbH & Co. KG Maschinenfabrik, Neuenrade, Germany) and compounded at 220° C. to pellets in a twin-screw extruder, e.g. Berstorff ZE 25×33D (KraussMaffei Berstorff GmbH, Hannover, Germany). The pellets are further injection molded to plaques with a thickness of 2 mm using a standard injection moulding machine, e.g. Engel HL60 (Engel Austria GmbH, Schwertberg, Austria). The processing temperature is around 240° C.

The surface and mechanical properties are summarized in table 1.

TABLE 1

| | Type of inventive co-additive | Scratch resistance ΔL (15N) "x-cut" [—] | Scratch resistance ΔL (20N) "x-cut" [—] | Tensile modulus [MPa] |
|---|---|---|---|---|
| Comparative example 1:<br>A: 2% Fusabond P 353 resin<br>B: 0.5% Atmer SA 1753 | | 0.8 | 2.1 | 1504 |
| Inventive example 1:<br>A + B + 0.5% Graphite FL 1690 | graphite | 0.2 | 0.7 | 1637 |
| Inventive example 2:<br>A + B + 0.5% Dyneon TF 2021 | PTFE | 0.8 | 1.2 | 1771 |
| Inventive example 3:<br>A + B + 0.5% molybdenum-sulfide | metal sulfide | 0.4 | 1.7 | 1700 |

TABLE 1-continued

| | Type of inventive co-additive | Scratch resistance ΔL (15N) "x-cut" [—] | Scratch resistance ΔL (20N) "x-cut" [—] | Tensile modulus [MPa] |
|---|---|---|---|---|
| Inventive example 4: A + B + 0.5% tungsten-sulfide | metal sulfide | 0.3 | 1.4 | 1707 |

Addition of specific friction reducing agents (such as graphite, PTFE or metal sulphide) thus improves scratch resistance and mechanical properties of TPO formulations comprising PP-graft-MA+fatty acid amide

EXAMPLE 2

Processing of Injection-Molded Plaques with TPO (Borealis Daplen EE 013AE)

Variation of PP-graft-MA content+0.3% fatty acid amide+0.5% PTFE

The formulations are prepared as in example 1, but instead of Borealis Daplen ED 012AE, Borealis Daplen EE 013AE is used.

The scratch performance properties are summarized in table 2.

TABLE 2

| | Fusabond P 353 resin content [%] | Atmer SA 1753 content [%] | Dyneon TF 2021 PTFE content [%] | Scratch resistance ΔL (15N) "length-cut" [—] | Scratch resistance ΔL (15N) "x-cut" [—] |
|---|---|---|---|---|---|
| Inventive ex. 5 | 0.5 | 0.3 | 0.5 | 0.5 | 1.4 |
| Comparative ex. 2 | 1.0 | 0.3 | | 0.8 | 1.7 |
| Inventive ex. 6 | 1.0 | 0.3 | 0.5 | −0.2 | 0.7 |
| Inventive ex. 7 | 1.5 | 0.3 | 0.5 | −0.4 | 0.8 |
| Comparative ex. 3 | 2.0 | 0.3 | | 0.6 | 3.5 |
| Inventive ex. 8 | 2.0 | 0.3 | 0.5 | 0.5 | 2.7 |

Improved scratch resistance by addition a friction reducing agent (here PTFE) as co-agent in TPO formulations comprising PP-g-MA+fatty acid amide; here variation of PP-graft-MA contents is shown.

EXAMPLE 3

Processing of Injection-Molded Plaques with TPO (Borealis Daplen EE 013AE)

PE-graft-MA content+0.3% fatty acid amide+0.5% PTFE

The formulations are prepared as in example 1, but instead of Borealis Daplen ED 012AE, Borealis Daplen EE 013AE is used.

The scratch performance properties are summarized in table 3.

TABLE 3

| | Ceramer 67 content [%] | Atmer SA 1753 content [%] | Dyneon TF 2021 PTFE content [%] | Scratch resistance ΔL (15N) "length-cut" [—] | Scratch resistance ΔL (15N) "x-cut" [—] |
|---|---|---|---|---|---|
| Comparative ex. 4 | 1.0 | 0.3 | | 0.5 | 2.9 |
| Inventive ex. 9 | 1.0 | 0.3 | 0.5 | 0.2 | 1.1 |

Addition of the friction reducing component (here PTFE) improves scratch resistance performance of TPO formulations comprising PE-g-MA (Ceramer 67)+fatty acid amide.

A fourth polymeric component is added to the combination of PP-graft-MA+erucamide+graphite or PTFE in the following examples.

EXAMPLE 4

Processing of Injection-Molded Plaques with TPO (Borealis Daplen EE 013AE)

PP-graft-MA content+0.3% fatty acid amide+0.5% PTFE+1% additional polymer component.

The formulations are prepared as in example 1, but instead of Borealis Daplen ED 012AE, Borealis Daplen EE 013AE is used.

The scratch performance properties are summarized in table 4.

TABLE 4

| | Fusabond P 353 resin content [%] | Atmer SA 1753 content [%] | Dyneon TF 2021 PTFE content [%] | Additional polymer component type | [%] | Scratch resistance[1] ΔL (15N) "length-cut" [—] | Scratch resistance[1] ΔL (15N) "x-cut" [—] |
|---|---|---|---|---|---|---|---|
| Comp. ex. 5 | 1.0 | 0.3 | | | | −1.1 | −1.4 |
| Inv. ex. 10 | 1.0 | 0.3 | 0.5 | | | | |
| Comp. ex. 6 | 1.0 | 0.3 | | Styroflex | 1.0 | −2.2 | −0.6 |
| Inv. ex. 11 | 1.0 | 0.3 | 0.5 | 2G 66 | 1.0 | | |
| Comp. ex. 7 | 1.0 | 0.3 | | Kraton | 1.0 | −1.8 | −1.2 |
| Inv. ex. 12 | 1.0 | 0.3 | 0.5 | G1652E | 1.0 | | |

[1]Relative improvement of the scratch resistance of inventive example compared to corresponding comparative example Addition of specific friction reducing agent (here PTFE) thus improves scratch resistance of TPO formulations comprising PP-graft-MA+fatty acid amide and an additional polymeric/elastomeric component.

EXAMPLE 5

Processing of Injection-Molded Plaques with TPO (Borealis Daplen EE 013AE)

PP-graft-MA content+0.3% fatty acid amide+0.5% graphite or PTFE+1% additional polymer component The formulations are prepared as in example 1, but instead of Borealis Daplen ED 012AE, Borealis Daplen EE 013AE is used.

The scratch performance properties are summarized in table 5.

Thus, addition of specific friction reducing agent (here PTFE or graphite) improves scratch resistance of TPO formulations comprising PP-graft-MA+fatty acid amide and an additional polymeric/elastomeric component.

What is claimed is:

1. A process for improving the scratch resistance of a rubber modified polymer, which process comprises mixing
    polytetrafluoroethylene as a friction reducing agent,
    a grafted polymer,
    an unsaturated fatty acid amide,
    a filler, and
    optionally, one or more further additives,
    with a rubber modified polymer,
    in respective amounts to obtain a composition comprising
    20 to 98 weight % of the rubber modified polymer,
    0.2 to 40 weight % of the grafted polymer,
    0.1 to 10 weight % of the friction reducing agent,
    0.1 to 1 weight % of the unsaturated fatty acid amide, and
    5 to 40 weight % of the filler,
    optionally 0.01 to 5 weight % of the one or more further additives,
    wherein the grafted polymer has a backbone selected from the group consisting of polypropylene, polyisobutylene, polyethylene, mixtures of polypropylene with polyisobutylene, mixtures of polypropylene with polyethylene, mixtures of different types of polyethylene, ethylene/propylene copolymers, propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene-/alkyl acrylate copolymers, ethylene/alkyl methacrylate copolymers, ethylene/vinyl

TABLE 5

| | Fusabond P 353 resin content [%] | Atmer SA 1753 content [%] | Inventive Co-additive type | [%] | Additional polymer component type | [%] | Scratch resistance[2] ΔL (15N) "length-cut" [—] | Scratch resistance[2] ΔL (15N) "x-cut" [—] |
|---|---|---|---|---|---|---|---|---|
| Comp. ex. 8 | 1.0 | 0.3 | | | | | 100% | 100% |
| Comp. ex. 9 | 1.0 | 0.3 | | | Engage 8200 | 1.0 | 85.7% | 100% |
| Inv. ex. 13 | 1.0 | 0.3 | Graphite | 0.5 | | 1.0 | 35.7% | 64.3% |
| Comp. ex. 10 | 1.0 | 0.3 | | | Modiper A4200 | 1.0 | 107.1% | 135.7% |
| Inv. ex. 14 | 1.0 | 0.3 | PTFE | 0.5 | | 1.0 | 64.3% | 64.3% |
| Inv. ex. 15 | 1.0 | 0.3 | Graphite | 0.5 | | 1.0 | 14.3% | 53.6% |
| Comp. ex. 11 | 1.0 | 0.3 | | | Modiper A5200 | 1.0 | 35.7% | 75.0% |
| Inv. ex. 16 | 1.0 | 0.3 | PTFE | 0.5 | | 1.0 | 42.9% | 71.4% |
| Inv. ex. 17 | 1.0 | 0.3 | Graphite | 0.5 | | 1.0 | 21.4% | 50.0% |

[2]Relative improvement of the scratch resistance compared to corresponding comparative example 8 acetate copolymers, polymers of ethylene with propylene and hexadiene, polymers of ethylene with propylene and dicyclopentadiene, polymers of ethylene with propylene and ethylidene-norbornene, polystyrene, acrylonitrile-butadiene-styrene polymers, styrene-butadiene-styrene triblock copolymers, styrene-acrylonitrile copolymers, acrylonitrile-acrylate elastomer-styrene copolymers, ethylene-propylene-diene copolymers, copolymers of ethylene with higher alpha-olefins, polybutadiene, polyisoprene, styrene-butadiene copolymers, hydrogenated styrene-butadiene copolymers, styrene-isoprene copolymers and hydrogenated styrene-isoprene copolymers; wherein the backbones are grafted with an unsaturated carboxylic acid monomer selected from the group consisting of acrylic acid, methacrylic acid, cyanoacrylic acid, maleic acid, 2-methyl maleic acid, 2-ethyl-maleic acid, 2-phenyl-maleic acid, 2,3-dimethyl maleic acid, fumaric acid and mixtures thereof; or with an anhydride or an ester of said monomers; or with a vinyl aromatic compound; or with two or more monomers selected from the group consisting of said unsaturated carboxylic acid monomers, esters thereof and the vinyl aromatic compound; and wherein the rubber modified polymer is a mixture of a polymer and a rubber-like component, where the polymer is a polypropylene, a styrene comprising polymer, a polyester, a polyamide, a copolyether amide, a copolyester amide, a thermoplastic elastomer on urethane basis, a polycarbonate, a polycarbonate/acrylonitrile-butadiene-styrene blend, an acrylonitrile-butadiene-styrene/poly(butylenes terephthalate) blend, poly(vinyl chloride), poly(vinyl chloride)/acrylonitrile-butadiene-styrene blend, poly(vinyl chloride)/acrylonitrile-strene-acrylate blend, acrylate-modified poly(vinyl chloride) or an ionomer; and the rubber-like component is an ethylene-α-olefin copolymer rubber, an ethylene-α-olefin-non-conjugated diene copolymer, natural rubber, isobutene rubber, butadiene rubber, polyisoprene, 1,2-polybutadiene, styrene-butadiene random copolymer rubber, chloroprene rubber, nitrile rubber, styrene-isoprene copolymer, styrene-isoprene-styrene block copolymer rubber, ethylvinyl-acetate copolymer, hydrogenated styrene-butadiene copolymers, hydrogenated styrene-isoprene copolymers or mixtures of two or more thereof.

2. A process according to claim 1, wherein the grafted polymer is a grafted polyethylene that has a backbone selected from the group consisting of polyethylene, mixtures of different types of polyethylene, ethylene/propylene copolymers, ethylene/but-1-ene copolymers, ethylene/hexene copolymers, ethylene/methylpentene copolymers, ethylene/heptene copolymers, ethylene/octene copolymers, ethylene/alkyl acrylate copolymers, ethylene/alkyl methacrylate copolymers, ethylene/vinyl acetate copolymers, polymers of ethylene with propylene and hexadiene, polymers of ethylene with propylene and dicyclopentadiene and polymers of ethylene with propylene and ethylidene-norbornene;

wherein the backbones are grafted with an unsaturated carboxylic acid monomer selected from the group consisting of acrylic acid, methacrylic acid, cyanoacrylic acid, maleic acid, 2 methyl maleic acid, 2-ethyl-maleic acid, 2-phenyl-maleic acid, 2,3-dimethyl maleic acid, fumaric acid and mixtures thereof; or with an anhydride or an ester of said monomers; or with a vinyl aromatic compound; or with two or more monomers selected from the group consisting of said unsaturated carboxylic acid monomers, esters thereof and the vinyl aromatic compound.

3. A process according to claim 1, wherein the unsaturated fatty acid amide is of the formula R—C(O)—NHR*,
wherein R is an unsaturated alkyl group having from 10 carbon atoms to 26 carbon atoms and R* is an unsaturated alkyl group having from 10 to 26 carbon atoms or hydrogen.

4. A process according to claim 1, wherein the unsaturated fatty acid amide is erucamide, oleamide, linoleamide or mixtures thereof.

5. A process according to claim 1 wherein the one or more further additives are present and are selected from the group consisting of hindered amine light stabilizers, hindered phenols, phosphites, benzofuranone stabilizers, hydroxyphenyl-benzotriazole, hydroxyphenyl-s-triazine, benzophenone ultraviolet light absorbers, nucleating agents, talcum, carbon black, calcium stearate and mixtures of two or more thereof.

6. A process according to claim 1 wherein the rubber modified polymer is a rubber modified polypropylene, the grafted polymer is polypropylene grafted with maleic anhydride or polyethylene grafted with maleic anhydride, and the unsaturated fatty acid amide is erucamide.

7. A process according to claim 1, wherein the rubber modified polymer is a rubber-modified polypropylene.

8. A process according to claim 1, wherein the filler comprises talc.

9. A process according to claim 1, wherein
the grafted polymer is present in an amount of about 2 to about 10 weight %;
the friction reducing agent is present in an amount of about 0.3 to about 3 weight %;
the unsaturated fatty acid amide is present in an amount of about 0.2 to about 0.4 weight %;
the rubber modified polymer is present in an amount of about 60 to about 98 weight %;
the one or more further additives are present in an amount of about 0.1 to about 1 weight %;
and the filler is present from 25 to 40 weight %.

10. A process according to claim 1, wherein the filler is selected from the group consisting of talc, Wollastonite, glass fibres, carbonfibres, calcium carbonate and mixtures thereof.

* * * * *